United States Patent [19]

McCullough, Jr.

[11] Patent Number: 4,459,385

[45] Date of Patent: Jul. 10, 1984

[54] PROPYLENE POLYMER COMPOSITIONS

[75] Inventor: J. Douglas McCullough, Jr., Houston, Tex.

[73] Assignee: Shell Oil Company, Houston, Tex.

[21] Appl. No.: 444,754

[22] Filed: Nov. 26, 1982

[51] Int. Cl.³ .................... C08L 23/08; C08L 53/00
[52] U.S. Cl. .................................................. 525/88
[58] Field of Search ........................................ 525/88

[56] References Cited

U.S. PATENT DOCUMENTS

| | | | |
|---|---|---|---|
| 3,328,486 | 6/1967 | Crawford et al. | 525/88 |
| 3,487,128 | 12/1969 | Okazaki et al. | 525/88 |
| 3,627,852 | 12/1971 | Aishima et al. | 525/88 |
| 3,632,674 | 1/1972 | Aishima et al. | 525/88 |
| 3,647,922 | 3/1972 | Leugering et al. | 525/88 |
| 3,929,932 | 12/1975 | Castagna | 525/88 |
| 4,128,607 | 12/1978 | Shiomura et al. | 526/348.6 |
| 4,172,875 | 10/1979 | Beyen et al. | 264/550 |
| 4,312,964 | 1/1982 | Sekine et al. | 525/88 |

OTHER PUBLICATIONS

Package Engineering "New Polyethylenes", 48/Feb. 1980, pp. 39–40.
Plastics World "New Materials", Dec. 1979, pp. 86.

*Primary Examiner*—Carman J. Seccuro
*Attorney, Agent, or Firm*—Dean F. Vance

[57] ABSTRACT

Extruded or molded shapes of compositions consisting essentially of certain sequentially polymerized ethylene-propylene copolymers and linear low density polyethylene of relatively low melt index (ASTM D1238-Condition E), not exceeding 5 dg/min, and density not exceeding 0.928, possess extremely good impact resistance without excessive loss of stiffness.

3 Claims, 3 Drawing Figures

PROPYLENE POLYMER COMPOSITIONS

BACKGROUND OF THE INVENTION

1. Field of the Invention

This invention relates to modified propylene polymer compositions of improved impact resistance. More particularly, the invention relates to blends of sequentially polymerized propylene copolymers with linear low density ethylene copolymers.

2. Description of the Prior Art

Polypropylene is a well known commercial polymer, used for a variety of products such as packaging films and extruded and molded shapes. It is produced by polymerization of propylene over transition metal coordination catalysts, specifically titanium halide containing catalysts. Commercial polypropylene is deficient in resistance to impact at low temperatures, i.e., 0° C. and below. It is known that incorporation of some elastomers, particularly elastomeric copolymers of ethylene and propylene, improves the low temperature impact resistance of polypropylene.

One method of incorporating elastomeric ethylene-propylene copolymers into polypropylene is by sequential polymerization of propylene and ethylene-propylene mixtures. In typical processes of this kind, propylene homopolymer is formed in one stage and the copolymer is formed in a separate stage, in the presence of the homopolymer and of the original catalyst. Multiple stage processes of this type are also known. Products of such sequential polymerization processes are often referred to as "block copolymers" but it is now understood that such products may rather be intimate blends of polypropylene and ethylenepropylene elastomer. The products of such sequential polymerization of propylene and ethylene-propylene mixtures, are referred to herein as sequentially polymerized propylene-ethylene copolymers or as in-situ produced copolymers. To maintain separate terminology for the total sequentially polymerized copolymer composition and the elastomeric copolymer fraction thereof, I may refer to the total copolymer composition as impact-improved propylene-ethylene copolymer which has a specified content of an elastomeric ethylene-propylene copolymer fraction and which is the product of sequential polymerization of propylene and a propylene-ethylene mixture.

Methods for producing impact-improved, sequentially polymerized propylene-ethylene copolymers are well known. See, for example, *"Toughened Plastics"* by C. B. Bucknall, Applied Science Publishers Ltd. 1977, pp 87-90, and T. G. Heggs in *Block Copolymers*, D. C. Allport and W. H. James (eds), Applied Science Publishers Ltd. 1973, chapter 4. Representative U.S. patents describing such methods are: U.S. Pat. Nos. 3,200,173—Schilling; 3,318,976—Short; and 3,514,501—Leibson et al.

Polyethylene is generally not compatible with polypropylene and not broadly useful for inclusion in propylene compositions to provide impact improvement. However, some specific compositions of polypropylene and polyethylene, often with other components, have been taught, as discussed below.

The art recognizes three types of polyethylene:

"High density polyethylenes" (HDPE), typically having densities in the range of 0.941 to 0.965 g/cc, may be produced by means of transition metal catalysts of the Ziegler-Natta type or Phillips Petroleum Company's chromia type in processes operating at relatively low pressures. They may also be referred to as low pressure polyethylenes. HDPEs are characterized by linearity and crystallinity.

"Low density polyethylenes" (LDPE), typically having densities in the range of 0.91 to 0.925 g/cc, are produced by a free radical mechanism in equipment operating at very high pressure. They are also referred to as high pressure polyethylene. Conventional LDPE is characterized by branching and absence of crystallinity.

"Linear low density polyethylenes" (LLDPE) are copolymers of ethylene with up to 15% of higher alpha olefins which are the products of polymerization at low pressures over certain transition metal catalysts. The products generally have densities in the range of 0.91 to 0.94 g/cc. A typical vapor phase process for the production of LLDPE is described in U.S. Pat. No. 4,011,382—Levine et al. Properties of LLDPE polymers produced by said process are also given in U.S. Pat. Nos. 4,243,619—Fraser et al and 4,303,710—Bullard et al. Liquid phase processes and their products are described in U.S. Pat. No. 4,128,607 to Ito et al and in U.K. Pat. No. 1,543,908 to Imperial Chemical Industries. LLDPEs are also described in brochures available from manufacturers of such polymers, including Dow Chemical Company, Exxon Corporation and Union Carbide Corporation.

LLDPE is characterized by linearity, but with regular short branches due to inclusion of the co-monomer. It has a low crystallinity and, hence, a lower density than linear HDPE and is not interchangeable with HDPE in typical HDPE applications. The differences between the properties of conventional LDPE produced in high pressure processes and LLDPE are such that the products cannot be used interchangeably in many applications and in many methods of manufacturing articles.

Compositions of polypropylene with various types of polyethylenes are disclosed in the following patents:

The use of LDPE in polypropylene to provide film compositions, which may be oriented polypropylene film compositions of improved impact resistance, are disclosed in British Pat. Nos. 1,005,333 to Avisun and 1,139,887 to Union Carbide Corporation, French Pat. No. 1,562,860 to Ethylene Plastique and German published applications Nos. 1,569,429 to VebaChemie and 2,042,342 to Lentia. Use of LDPE in propylene polyalomers to provide coating compositions is disclosed in U.S. Pat. No. 3,887,640 to Diaz et al.

Whereas the above patents employ LDPE in polypropylene film compositions, several patents directed to polypropylene compositions for other uses, i.e., for shaped articles, employ HDPE. These are U.S. Pat. Nos. 3,281,501 to Coats et al; 3,358,053 to Hostetler; 3,627,852 to Aishima; 3,647,922 to Leugering et al; 3,929,932 and 3,937,758 both to Castagna et al. Coats et al, disclose compositions of polypropylene with "low pressure linear polyethylene" (HDPE) as having improved impact resistance and state that the high pressure process, branched polyethylenes are not effective for the desired impact improvement. Hostetler is directed to compositions in which the impact resistance of propylene/ethylene copolymer is improved by addition of polyethylene which is a substantially linear polymer of 0.93–0.96 density, produced by a low pressure catalyst system (HDPE), and milling of the blend at 175°–225° C. for 7–15 minutes. The propylene/ethylene copolymer of Hostetler may be a block copolymer or a random copolymer. Aishima is directed to ternary compositions consisting of polypropylene, polyethylene and ethylene/propylene block copolymer having an ethylene content of 7–93 mole percent. It is asserted that these compositions have enhanced impact resistance at low temperatures without loss of rigidity, strength and resistance to high temperature. Polyethylene which may be used can be either HDPE or LDPE; however, the use of the high density polyethylene is preferred. The Castagna et al patents are direct to compositions of sequentially polymerized propylene-ethylene copolymers with linear polyethylenes having a relatively high density, i.e., a density of at least 0.93 and a melt index in the range of about 0.2 to 1.0. The polyethylene is disclosed as being known and described in three U.S. patents which are directed to use of supported chromia catalysts, and as being a homopolymer or copolymer with up to 5% of a $C_3$–$C_8$ comonomer. The polyethylenes used in the illustrative examples were homopolymers. Leugering et al blend polyethylenes of melt index 1–30, produced by low pressure polymerization over transition metal catalysts, with sequentially polymerized propylene-ethylene copolymers to produce molding compositions of good low temperature impact resistance and improved transparency.

U.S. Pat. No. 4,172,875 to Beijen et al, is directed to forming of articles from modified polypropylene sheet by fluid pressure forming in the solid phase. Improved articles are produced by employing sheet made of a composition consisting of polypropylene or poly(propylene/ethylene) with low density polyethylene.

In the production of articles of substantial thickness, e.g., 2 mm or more, from polypropylene, one of the desirable properties is stiffness. In articles which may be exposed to low temperature during storage or use, another desired property is impact resistance at low temperature. As explained above, improved impact resistance is conventionally achieved by incorporation of ethylene-propylene elastomer copolymer, either by blending or by sequential polymerization. In such compositions there is invariably a tradeoff between stiffness and low temperature impact resistance, since incorporation of elastomer decreases stiffness. This invention is directed to compositions which provide a desired balance of these three properties in an economical manner.

SUMMARY OF THE INVENTION

I have found that extruded or molded shapes of certain compositions consisting essentially of sequentially polymerized ethylene-propylene copolymer and linear low density polyethylene of relatively low melt index (ASTM D1238-Condition E), not exceeding 5 dg/min, and density not exceeding 0.928 possess extremely good impact resistance without excessive loss of stiffness.

Broadly, the compositions of this invention consist of blends of 50–95% by weight of sequentially polymerized propylene-ethylene copolymer which has a melt flow (ASTM D1238-Condition L) of about 1–50 dg/min and contains about 5–50% by weight of an elastomeric ethylene-propylene copolymer portion which has a total ethylene content of 30–95% by weight, with 5–50% by weight of a linear low density copolymer of ethylene with a higher alpha olefin, which has a density in the range from 0.912 to 0.928 g/cc and a melt index not exceeding 5 dg/min. In the best compositions, the sequential propylene ethylene copolymer has an ethylene-propylene random copolymer content of 8–15% by weight, the random copolymer fraction has a total ethylene content of 45–65% by weight and the composition consists of 75–85% by weight of such sequential copolymer having a melt flow of about 1–50 dg/min and 15–25% by weight of LLDPE having a melt index not in excess of about 1.0 and a density not in excess of 0.921.

DESCRIPTION OF THE INVENTION

Figure 1:
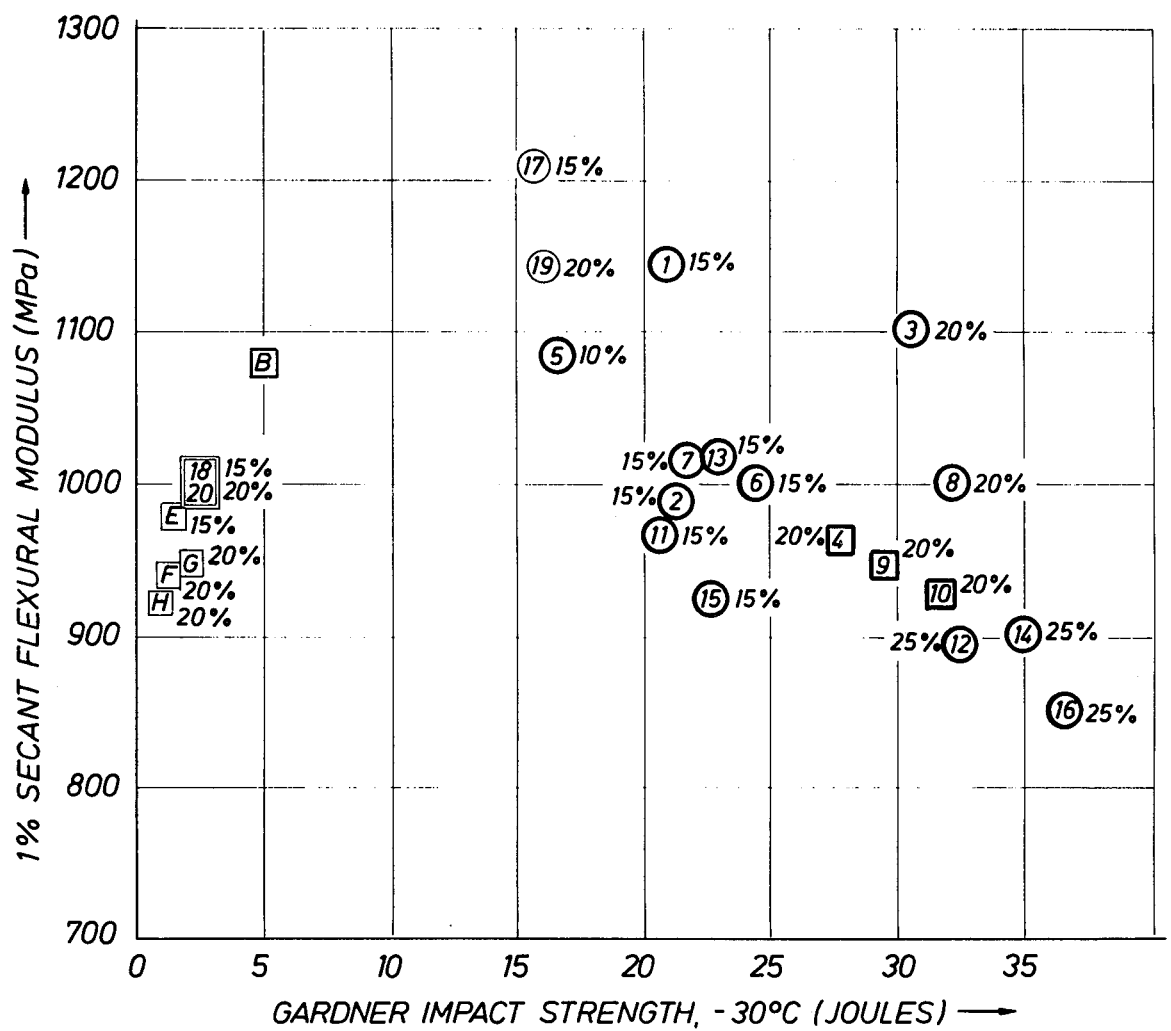
FIGS. 1 and 2 of the drawing are plots of stiffness, expressed as secant flexural modulus, versus low temperature impact resistance, measured by the Gardner method. The plots illustrate these properties for compositions according to the invention and for control compositions.

This invention is directed to modified polypropylene polymer molding compositions which provide good low temperature impact resistance at acceptable levels of stiffness in extruded or injection molded articles.

Before discussing the invention further, reference is made to the methods of measuring impact resistance and stiffness, employed in this description.

Impact resistance may be measured by a variety of methods. A frequently employed method is the notched Izod impact test (ASTM D-256). This test shows some correlation with impact resistance as experienced in commercial use. Various falling weight type impact tests often correlate better with commercial applications. The falling weight method employed in this description is the Gardner impact test. In that method an impacting device having a ⅝ inch diameter rounded tip rests on the injection molded circular sample disc (125 mil thick) which is supported at the rim. The sample disc is one of a series from the same composition, which has, in this case, been cooled to $-30°$ C. A weight is dropped on the impacting device from a variable measured height. The sample disc is replaced after each drop; the height from which the weight is dropped is varied until the breaking point of the series of discs is defined. The impact strength, reported in units of Joules, ft-lbs or in-lbs, is the product of the mass of the dropped weight and the height of drop at which 50% of the discs resist breaking.

The stiffness of test strips molded from various compositions is reported as the 1% secant flexural modulus, determined in a standard test (ASTM D790) performed at 0.05 inch per minute. Flexural modulus may be reported in units of megapascals (MPa) or pounds per square inch (psi).

As described in the discussion of the prior art, it is known that the low temperature impact resistance of propylene homopolymers is deficient for uses where articles may be exposed to temperatures of 0° C. or below. Commercially, low temperature impact resistance of propylene polymers is improved by blending polypropylene homopolymers with certain elastomers, particularly ethylene-propylene copolymers, or with mixtures of such elastomers with high density polyethylene, or by introducing ethylene-propylene elastomer into the propylene polymer during polymerization by a sequential polymerization process. As a general rule, impact resistance increases with increasing amounts of elastomer in the total composition. One of the adverse effects of the addition of ethylene-propylene elastomer is the concomitant reduction in stiffness of the product, stiffness being one of the attractive properties of propylene homopolymer. The balance of impact and stiffness is critical in the judging of the performance of polypropylene molding and extrusion compositions. Even though the admixture of polyethylene to improve the impact resistance of polypropylene composition, including sequentially polymerized propylene-ethylene copolymers, has been disclosed in patents issued as early as 1966, as referred to above, such compositions have apparently found no practical use in commerce.

Impact improved propylene polymers are often referred to in the trade as "medium impact", "high impact", and "extra high impact" polypropylene. Typical ranges of properties for commercial products of this type are as follows:

| Property | Medium Impact | High Impact | Extra High Impact |
|---|---|---|---|
| 1% Secant flexural modulus, MPa | 1000–1430 | 800–1200 | 700–1100 |
| Impact Strength (125 mil discs) | | | |
| Gardner at −30° C., J | 1–15 | 15–30 | 30–45 |
| Izod, notched, at 23° C. J/m | 60–100 | 100–300 | 300–No break |

I have now found that I can produce excellent medium, high or extra high impact propylene polymers which maintain adequate stiffness by blending sequentially polymerized propylene-ethylene copolymers with linear low density polyethylene, provided the linear low density polyethylene is of relatively low melt index, not exceeding about 5 dg/min. Blends according to this invention exhibit better impact-stiffness properties than analogous blends of the same propylene-ethylene copolymers with either high pressure low density polyethylene (LDPE) or conventional high density polyethylene (HDPE).

Sequentially polymerized propylene-ethylene copolymers which are improved according to this invention are materials of commerce. They may be produced by sequential polymerization of propylene and propylene-ethylene mixtures by contact with Ziegler-Natta coordination catalysts, specifically those in which the transition metal is titanium, by well known methods. Such methods are described, for example, in the literature cited above. The catalysts generally employed in commercial processes are combinations of a violet TiCl3 composition with an aluminum alkyl compound such as diethyl aluminum chloride. Newer types of coordination catalysts, such as compositions of TiCl4 supported on magnesium chloride and modified with an elecron donor, which are used with an aluminum trialkyl cocatalyst and a selectivity control agent such as an aromatic ester, may also be used to produce the sequentially polymerized copolymers.

The sequentially polymerized propylene-ethylene copolymers should have compositions and properties in the following ranges:

| | Suitable | Preferred | Best |
|---|---|---|---|
| Homopolymer, % Weight | 50–95 | 80–95 | 85–92 |
| Ethylene-Propylene Copolymer, % Weight | 50–5 | 20–5 | 15–8 |
| Ethylene Content of Copolymer Fraction, % Weight | 30–95 | 40–70 | 45–65 |
| Melt Flow, dg/min | 1–50 | 1–50 | 1–50 |

Linear low-density polyethylenes which may be blended with said propylene-ethylene copolymers according to this invention are random copolymers of ethylene with 1–15% by weight, and typically with no more than 10%, of higher alpha-olefin co-monomer, e.g. propylene, n-butene-1, n-hexene-1, n-octene-1 or 4-methylpentene-1, produced over transition metal coordination catalysts. Such polymers are commercially available. Commercial products generally are produced in liquid phase or vapor phase polymerization processes. LLDPE polymers suitable for use in this invention should have properties in the following ranges:

| | Suitable | Preferred | Best |
|---|---|---|---|
| Melt Index, dg/min (ASTM D1238 Cond: E) | 0–5 | 0–3 | 0.4–1 |
| Density, g/cc | 0.917–0.928 | 0.917–0.928 | 0.917–0.921 |
| Tensile Properties (ASTM D638) | | | |
| Yield, MPa | 8–17 | 8–15 | 8–12 |
| Break, MPa | 8–25 | 10–25 | 15–25 |
| Elongation at Break, % | 100–1200 | 400–1200 | 600–1200 |
| Brittleness Temperature, °C. | <−80 | <−80 | <−80 |

The blended compositions of this invention contain sequentially polymerized propylene-ethylene copolymer and LLDPE in the following proportions:

| | Suitable | Preferred | Best |
|---|---|---|---|
| Copolymer % w | 50–95 | 70–90 | 75–85 |
| LLDPE % w | 50–5 | 30–10 | 25–15 |

It will be understood that the proportions of components as well as the properties of the blended components may be selected to provide the best balance of properties and cost for any particular intended use. In some cases a lower performance level may be relatively satisfactory and may be commercially preferred if it can be achieved at a lower cost. Generally, the cost of LLDPE is lower than that of sequentially polymerized propylene-ethylene copolymer.

In producing the blended compositions of this invention, the mixing method is not critical, so long as an intimate blend is achieved. In the case of commercial LLDPE in granular form, it is often sufficient to dry-blend the components and pass the mixture once through the finishing equipment, such as injection molding or sheet extrusion machines employing a screw extruder. For LLDPE in pellet form it was found necessary to pre-extrude the base stock and LLDPE, i.e., to pass the dry-blend through an extruder and repelletize it to produce a blended composition suitable for achieving the claimed property improvement when used, for example, in injection molding.

The compositions of this invention may of course contain stabilizers and additives conventionally employed in similar polyolefin compositions, such as antioxidants, stabilizers against actinic radiation, antistatic additives, crystallinity nucleating agents, pigments and mineral fillers.

The compositions of the invention are suitable for the same uses as the commercially used impact-improved polypropylenes, e.g., for automobile trim parts, battery containers, tote boxes, crates, bottles, appliance parts and the like.

The invention is illustrated by the following examples.

Unless otherwise stated, the blended compositions were prepared by dry-blending the propylene polymer base stock with pelletized or granular LLDPE, extruding the mixture as strands from a 1-inch Killion extruder and pelletizing the extrudate. Test specimens of the blended compositions were made by injection molding with an Arburg reciprocating screw machine.

Mechanical properties were determined by standard tests, as indicated in the Examples.

Several different propylene polymer base stocks and LLDPEs were employed in the examples. They are identified in Tables 1 and 2.

Among the base stocks, PP-1 and PP-2 were produced with a conventional $TiCl_3.1/3AlCl_3$ based catalyst, and PP-3, 4 and 5 were produced with a $MgCl_2$-supported $TiCl_4$ based catalyst; the base stocks contained different proportions of elastomeric fraction. PP-6 is a homopolymer and EP-1 and EP-2 are elastomeric random ethylene-propylene copolymers employed in control experiments.

Among the LLDPEs, PE-1 and 2 are commercial products from a solution polymerization process and PE-3 through 9 are commercial products from vapor phase polymerization processes. In each group, the products differ in melt index. PE-10 is a commercial high pressure polyethylene and PE-11 a commercial high density polyethylene.

Figure 2:
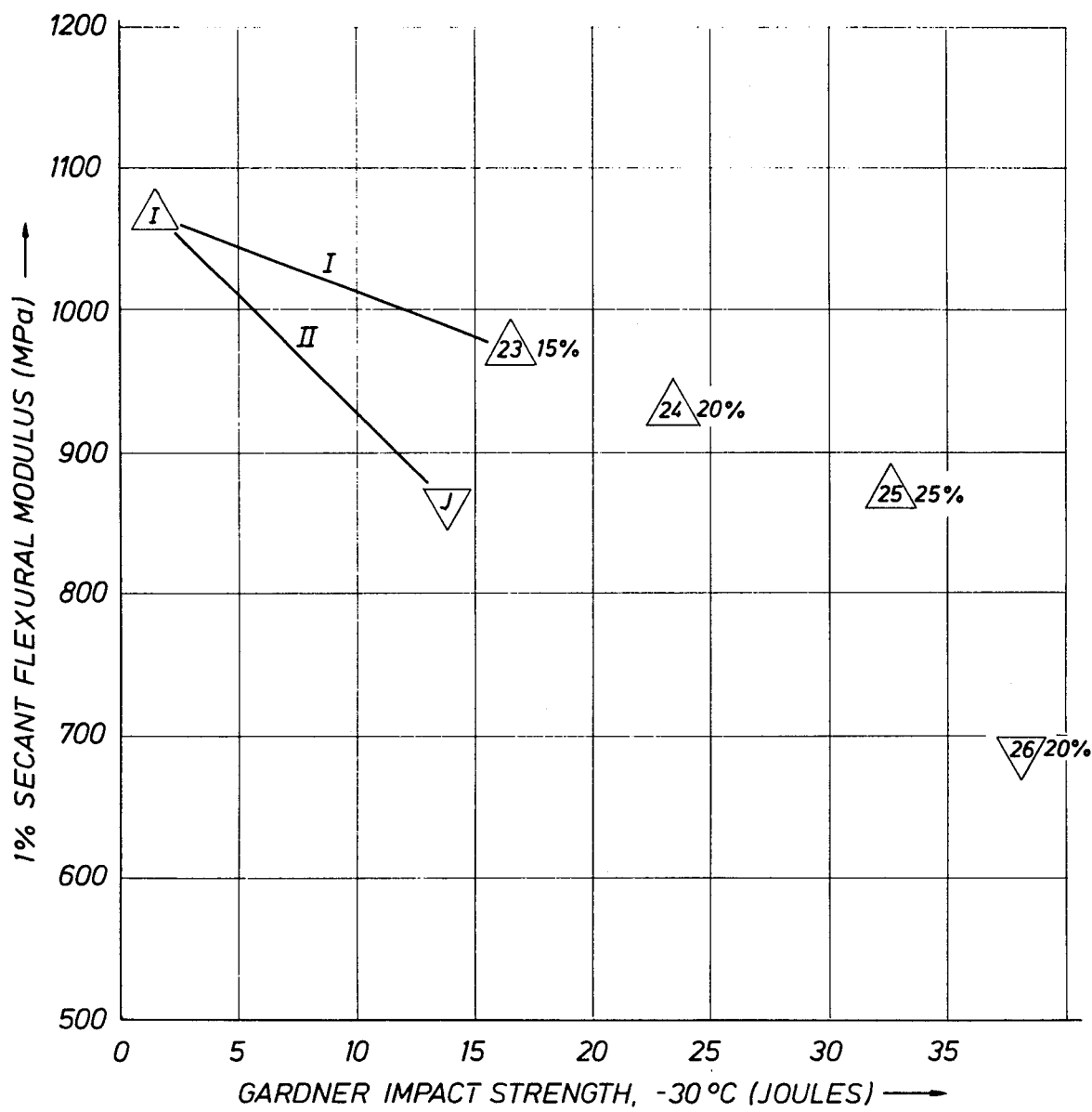
Figure 3:
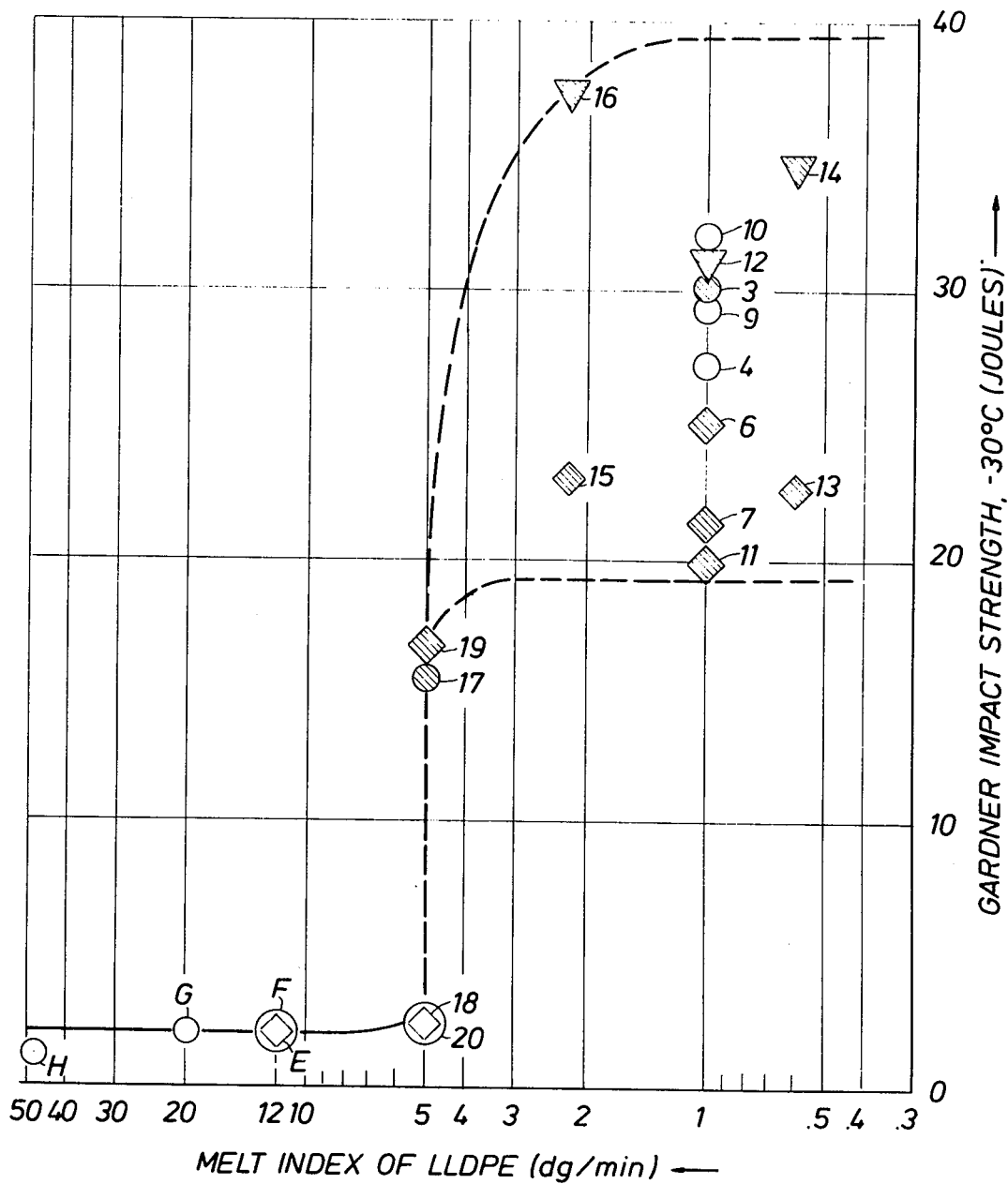
FIG. 3 is a semi-log plot of the low temperature ($-30°$ C.) Gardner impact strength of compositions of this invention versus the melt index of the LLDPE employed, illustrating the criticality of employing an LLDPE having a melt index not exceeding 5.

Some of the data from the Examples are plotted in FIGS. 1–3 of the drawing.

FIG. 1 shows the balance of stiffness versus impact resistance for blends made with copolymers produced by sequential polymerization of propylene and ethylene-propylene mixtures over conventional polymerization catalysts based on $TiCl_3.1/3AlCl_3$ combined with diethyl aluminum chloride. FIG. 2 shows the same relationship for some base stocks produced with a new type of catalyst, $TiCl_4/MgCl_2$/electron donor composition employed with aluminum triethyl as cocatalyst and an aromatic ester as third component.

The numbered experimental points (with exceptions pointed out below) represent compositions according to this invention and the letters represent comparative examples.

As evident from the Figures and Tables, adding LLDPE to sequentially polymerized copolymer increases impact resistance at the expense of stiffness. However, the range of stiffness for compositions according to this invention (850–1200 1% secant flexural modulus) is within the range acceptable for high impact and extra high impact polypropylene which heretofore has required either difficult to produce in-situ copolymers with high elastomer loadings, or blending of in-situ copolymer with critically selected EPR or EPDM copolymers.

Lines I and II in FIG. 2 illustrate this aspect of the invention. Example I represents the properties of PP-3, a sequentially produced copolymer with 10.9% copolymer fraction of 58% ethylene content. This polymer has a Gardner impact value of 1.4J and a secant flexural modulus of 1070 MPa. As shown by Line I, the impact strength of this polymer can be increased to 16.5J with a reduction of stiffness to 966 (Example 23) by blending it with a 1 melt index LLDPE to produce a blend containing 15% LLDPE. As shown by Line II, another way to produce a polymer of similar impact value is to increase the copolymer fraction of the sequentially polymerized polymer. Example J is such a polymer; its copolymer fraction is 16.5%. It has an impact value of 13.9J (less than the blend) and a significantly lower stiffness of 863 MPa.

FIG. 3 illustrates the criticality of using LLDPE of low melt index as blending stock. A melt index of 5 dg/min represents the borderline of suitability. In blend stock PP-1 (Examples 17 and 19) it provided a significant improvement in impact resistance. In blend stock PP-2 (Examples 18 and 20) it provided no significant impact improvement. All properly blended compositions with LLDPE of less than 5 melt index were highly effective in providing improved impact resistance. Blend stock PE-4, the 5 melt index LLDPE, had a density of 0.934, which is higher than desired for use according to this invention. This may also have contributed to its erratic behavior. It was used, in the absence of an LLDPE of that melt index with lower density, for evaluating the effect of melt index in that range. Since the still higher melt index LLDPEs PE-7, 8 and 9 had lower densities (0.924–0.926), it is apparent that the data support that melt index is the factor which primarily affects the impact resistance of the blends.

The only samples prepared by injection molding without pre-extrusion are Examples 21 and 22 of Table 3. The granular product PE-5 of Example 21 provided a composition with useful properties comparable to the same composition injection molded afte pre-extrusion (Example 13). The pelletized product of Example 22 exhibited significantly lower Gardner impact resistance although only slightly lower Izod impact resistance, compared to the same composition after pre-extrusion (Example 15).

TABLE 1

| | | PROPYLENE POLYMERS EMPLOYED IN EXAMPLES | | | |
|---|---|---|---|---|---|
| DESIG-NATION | TYPE | CATALYST TYPE IN POLYMER PRODUCTION | COPOLYMER FRACTION % WT. | ETHYLENE CONTENT OF COPOLYMER FRACTION % WT. | MELT FLOW dg/min[a] |
| PP-1 | In Situ Copolymer | $TiCl_3.\frac{1}{3}AlCl_3$ | 14 | 45 | 3.5 |
| PP-2 | In Situ Copolymer | $TiCl_3.\frac{1}{3}AlCl_3$ | 14 | 45 | 5.2 |
| PP-3 | In Situ Copolymer | Ti/Mg/ED/Cl | 10.9 | 58.0 | 6.0 |
| PP-4 | In Situ Copolymer | Ti/Mg/ED/Cl | 16.5 | 61.8 | 1.2 |
| PP-5 | In Situ Copolymer | Ti/Mg/ED/Cl | 8.6 | 36.3 | 4.8 |

TABLE 1-continued
PROPYLENE POLYMERS EMPLOYED IN EXAMPLES

| DESIG-NATION | TYPE | CATALYST TYPE IN POLYMER PRODUCTION | COPOLYMER FRACTION % WT. | ETHYLENE CONTENT OF COPOLYMER FRACTION % WT. | MELT FLOW dg/min[a] |
|---|---|---|---|---|---|
| PP-6 | Copolymer Homopolymer | Ti/Mg/ED/Cl | 0 | — | 2.0 |
| EP-1 | Random Copolymer[b] (elastomer) | | 100 | ca. 60 | — |
| EP-2 | Random Copolymer (elastomer) | Ti/Mg/ED/Cl | 100 | 60 | — |

[a] ASTM D-1238-Condition L
[b] B. F. Goodrich EPCAR 306

TABLE 2
POLYETHYLENE EMPLOYED IN EXAMPLES

| | COMMERCIAL PRODUCT | | | | | TENSILE PROPERTIES[b] | | |
|---|---|---|---|---|---|---|---|---|
| DESIG-NATION | SOURCE | PROCESS | TRADE DESIG-NATION | GRADE | MELT INDEX[a] dg/min | Density g/cc | YIELD MPa | BREAK MPa | BREAK ELON. % |
| PE-1 | DOW | Solution | Dowlex | 2045 | 1.0 | 0.920 | 12.4 | 24.1 | 1100 |
| PE-2 | DOW | Solution | Dowlex | 2047 | 2.3 | 0.917 | 11.0 | 18.6 | 900 |
| PE-3 | Exxon | Gas Phase | Escorene | LPX-1 | 1.0 | 0.918 | — | — | 700 |
| PE-4 | Exxon | Gas Phase | Escorene | LPX-12 | 5.0 | 0.934 | 14.5 | 21.4 | 700 |
| PE-5 | Union Carbide | Gas Phase | G-Resin | 6937 | 0.6 | 0.918 | — | — | 700 |
| PE-6 | Union Carbide | Gas Phase | G-Resin | 7047 | 1.0 | 0.918 | — | — | 700 |
| PE-7 | Exxon | Gas Phase | Escorene | LPX-16 | 12.0 | 0.926 | 11.4 | 9.7 | 350 |
| PE-8 | Exxon | Gas Phase | Escorene | LPX-15 | 20.0 | 0.924 | 10.7 | 8.6 | 350 |
| PE-9 | Exxon | Gas Phase | Escorene | LPX-11 | 50.0 | 0.926 | 10.3 | 7.2 | 100 |
| PE-10 | Northern Petrochemical | High Pressure LDPE | NPE | 940 | 0.25 | 0.919 | — | — | 750 |
| PE-11 | USI | HDPE | Petrothene | LB861 | 2.0 | 0.962 | — | — | — |

[a] ASTM D-1238-Condition E
[b] ASTM D-638

EXAMPLES 1–22

Comparative Examples A–H

These examples illustrate the improvements in low temperature impact resistance obtained by blending 10–25% of several LLDPE compositions with two PP base stocks, both being similar sequentially polymerized medium impact propylene-ethylene copolymers produced over conventional commercial violet titanium trichloride/diethyl aluminum chloride catalyst.

The polymer compositions and their properties, as determined on injection molded specimens, are shown in Table 3.

Examples A and B show the properties of the base stocks without admixture of LLDPE. Examples C and D show the effect of replacement of LLDPE by conventional (high pressure) low density polyethylene (LDPE) and high density polyethylene (HDPE), respectively. It is evident that neither polyethylene type displays the excellent Gardner impact strength enhancement characteristics inherent in the preferred LLDPE materials having similar or slightly higher melt indexes. Although addition of HDPE (Example D) results in good modulus retention, it is not substantially better than LLDPE in that regard, and LLDPE has the advantage that it can be used at a lower level to achieve essentially the same degree of impact strength enhancement. (See Examples 5 and 6 with 10% w and 15% w PE-3). On the other hand, modification of sequential copolymers with LDPE (Example C) leads to products with lower levels of both stiffness and impact strength relative LLDPE.

Examples 1–4 and 6–12 show that addition of 15–25% wt of different LLDPEs of the same melt index of 1 produced great improvements in impact resistance, with some loss of stiffness but to a still acceptable level. In Example 5, addition of only 10% LLDPE still provided significantly improved impact resistance. The LLDPEs in Examples 1–4 were products of a solution process and those in Examples 5–12 of a vapor phase process. They were equally effective. Examples 13 and 14 show that a 0.6 melt index LLDPE provided even slightly better impact values at comparable stiffness, compared especially with Examples 11 and 12. Examples 15 and 16, show that a 2.3 melt index LLDPE provided still slightly better impact values, but at a further reduction in stiffness, compared especially to similar polymer PE-1 in Examples 1–4. However use of blending stock PE-4, a 5 melt index LLDPE from the same source as PE-3, (but which had a density of 0.934, i.e. above that desired in the composition of this invention) shown in Examples 17–20, resulted in relatively higher stiffness and a much smaller improvement in impact resistance when used in base stock PP-1 and a very small increase in impact resistance when used in base stock PP-2.

Examples E–H show that use of LLDPE having a melt index beyond 5 dg/min provides no significant improvement in impact strength relative to the unblended base polymer (PP-2). (See also FIG. 3).

Examples 21 and 22 represent production of test specimens in which the dry-blend was directly charged to the injection molding extruder without preliminary pelletizing. The LLDPE in Example 21 was in granular form, that in Example 22 pelletized. The former was substantially as effective without pre-compounding; the latter requires precompounding.

EXAMPLES 27-28

Comparative Example K

These examples show that a sequentially polymerized propylene-ethylene copolymer produced with the same catalyst as used in Examples I and J, in which the copolymer fraction was only 8.6%, was also improved by

TABLE 3

MECHANICAL PROPERTIES OF BLENDS

| EXAMPLE | BASE STOCK | LLDPE | % W | PE MELT INDEX[a] dg/min | BLEND MELT FLOW[b] dg/min | 1% SECANT FLEXURAL MODULUS[c] MPa | GARDNER IMPACT STRENGTH, −30° C. J | NOTCHED IZOD IMPACT STRENGTH[d], 23° C. J/M |
|---|---|---|---|---|---|---|---|---|
| A | PP-1 | | 0 | | 3.5 | ~1380 | ~3.0 | — |
| B | PP-2 | | 0 | | 5.2 | ~1080 | 1.4 | — |
| C | PP-1 | PE-10 | 20 | 0.25 | 2.7 | 867 | 20.4 | — |
| D | PP-1 | PE-11 | 20 | 2.0 | 3.2 | 1150 | 18.2 | — |
| 1 | PP-1 | PE-1 | 15 | 1.0 | 3.5 | ~1140 | 21.1 | — |
| 2 | PP-1 | PE-1 | 15 | 1.0 | 3.6 | 978 | 21.3 | 172 |
| 3 | PP-1 | PE-1 | 20 | 1.0 | 3.4 | ~1100 | 30.2 | — |
| 4 | PP-2 | PE-1 | 20 | 1.0 | 4.0 | 957 | 27.9 | — |
| 5 | PP-1 | PE-3 | 10 | 1.0 | 4.3 | 1080 | 16.3 | — |
| 6 | PP-1 | PE-3 | 15 | 1.0 | 3.6 | 1000 | 24.5 | — |
| 7 | PP-1 | PE-3 | 15 | 1.0 | 3.6 | 1010 | 21.6 | 149 |
| 8 | PP-1 | PE-3 | 20 | 1.0 | 3.2 | 1000 | 32.3 | — |
| 9 | PP-2 | PE-3 | 20 | 1.0 | 3.4 | 951 | 29.4 | — |
| 10 | PP-2 | PE-3 | 20 | 1.0 | 3.4 | 926 | 31.9 | 237 |
| 11 | PP-1 | PE-6 | 15 | 1.0 | 3.2 | 960 | 20.7 | 181 |
| 12 | PP-1 | PE-6 | 25 | 1.0 | 3.0 | 894 | 32.1 | 488 |
| 13 | PP-1 | PE-5 | 15 | 0.6 | 2.9 | 1010 | 22.7 | 174 |
| 14 | PP-1 | PE-5 | 25 | 0.6 | 2.5 | 897 | 34.7 | 564 |
| 15 | PP-1 | PE-2 | 15 | 2.3 | 3.3 | 926 | 22.7 | 185 |
| 16 | PP-1 | PE-2 | 25 | 2.3 | 3.4 | 845 | 36.2 | 492 |
| 17[e] | PP-1 | PE-4 | 15 | 5.0 | 4.1 | ~1210 | 15.9 | — |
| 18[e] | PP-2 | PE-4 | 15 | 5.0 | 4.7 | 1000 | 2.5 | 79.9 |
| 19[e] | PP-1 | PE-4 | 20 | 5.0 | 4.0 | ~1140 | 16.0 | — |
| 20[e] | PP-2 | PE-4 | 20 | 5.0 | 4.8 | 992 | 2.5 | 82.6 |
| 21[f] | PP-1 | PE-5 | 15 | 0.6 | — | 1060 | 19.6 | 199 |
| 22[g] | PP-1 | PE-2 | 15 | 2.3 | — | 1020 | 7.8 | 174 |
| E | PP-2 | PE-7 | 15 | 12 | 5.3 | 979 | 1.4 | 78.0 |
| F | PP-2 | PE-7 | 20 | 20 | 5.5 | 942 | 1.8 | 81.2 |
| G | PP-2 | PE-8 | 20 | 20 | 5.7 | 945 | 2.0 | 82.3 |
| H | PP-2 | PE-9 | 20 | 50 | 7.1 | 927 | 1.1 | 69.6 |

[a] ASTM D1238 - Condition E
[b] ASTM D1238 - Condition L
[c] ASTM D790, 0.05 in/min strain rate
[d] ASTM D256
[e] PE-4 had density above 0.928
[f] Injection molded without preextrusion; LLDPE in granular form
[g] Injection molded without preextrusion; LLDPE in pellet form

EXAMPLES 23-26

Comparative Examples I-J

These examples illustrate similar improvements when using as base stocks two propylene-ethylene copolymers sequentially polymerized over a magnesium chloride-supported titanium tetrachloride catalyst. The data are shown in Table 4. The base polymers, shown in Examples I (10.9% copolymer fraction) and J (16.5% copolymer fraction), had less than desirable low temperature impact resistance, which was greatly improved by incorporation of LLDPE.

addition of 15% of two different LLDPE polymers, although to a much smaller extent than the copolymers of examples I and J. The data are shown in Table 4.

Comparative Examples N and O

These examples represent blends of propylene homopolymer with an ethylene-propylene elastomer and LLDPE. The data are shown in Table 4. The examples show that 15 or 20% LLDPE does not provide any substantial increase in impact strength in a blended mixture of homopolymer and EPR, while it provides a substantial increase when used in sequentially polymerized products, as in the numbered examples.

TABLE 4

MECHANICAL PROPERTIES OF BLENDS

| EXAMPLE | BASE STOCK | LLDPE | % W | LLDPE MELT INDEX[a] dg/min | BLEND MELT FLOW[b] dg/min | 1% SECANT FLEXURAL MODULUS[c] MPa | GARDNER IMPACT STRENGTH, −30° C. J |
|---|---|---|---|---|---|---|---|
| I | PP-3 | — | — | — | 6.0 | 1070 | 1.4 |
| 23 | PP-3 | PE-3 | 15 | 1.0 | 5.7 | 966 | 16.5 |
| 24 | PP-3 | PE-1 | 20 | 1.0 | 5.4 | 932 | 23.2 |

TABLE 4-continued

| | | MECHANICAL PROPERTIES OF BLENDS | | | | | |
|---|---|---|---|---|---|---|---|
| | BLEND COMPOSITION | | | | | | |
| EX-AMPLE | BASE STOCK | LLDPE | % W | LLDPE MELT INDEX[a] dg/min | BLEND MELT FLOW[b] dg/min | 1% SECANT FLEXURAL MODULUS[c] MPa | GARDNER IMPACT STRENGTH, −30° C. J |
| 25 | PP-3 | PE-3 | 25 | 1.0 | 4.4 | 863 | 32.6 |
| J | PP-4 | — | | | 1.2 | 863 | 13.9 |
| 26 | PP-4 | PE-1 | 20 | 1.0 | 1.1 | 690 | 38.4 |
| K | PP-5 | — | — | — | — | 1100 | 0.5 |
| 27 | PP-5 | PE-1 | 15 | 1.0 | 4.2 | 966 | 1.3 |
| 28 | PP-5 | PE-3 | 15 | 1.0 | 4.3 | 1000 | 1.6 |
| N | PP-6 | PE-1 | 15 | 1.0 | 2.3 | 1040 | 0.6 |
| | | EP-1 | 5 | — | | | |
| O | PP-6 | PE-1 | 20 | 1.0 | 1.9 | 966 | 2.9 |
| | | EP-2 | 11 | — | | | |

[a]ASTM D1238 - Condition E
[b]ASTM D1238 - Condition L
[c]ASTM D790, 0.05 in/min strain rate
[d]ASTM D256

What is claimed is:

1. A high impact polyolefin composition consisting essentially of a binary polymer blend of (i) 75–85% by weight of an impact-modified propylene polymer which has a melt flow of (ASTM D1238-Condition L) of about 1–50 dg/min and an elastomeric propylene-ethylene copolymer content of 5–50% by weight, the copolymer fraction having an ethylene content of 30–95% by weight, which is the product of sequential polymerization of propylene and a propylene-ethylene mixture over a titanium halide-containing coordination catalyst and (ii) 15–25% by weight of a linear low density ethylene copolymer which is the product of polymerization of ethylene with up to 15 mole percent of at least one $C_3$–$C_8$ alpha olefin monomer over a transition metal-based coordination catalyst and which has a density in the range from 0.917 to 0.921 and a melt index (ASTM D1238-Condition E) not exceeding 5.

2. The composition according to claim 1, wherein the proportion of propylene-ethylene copolymer fraction thereof is 5–20% by weight; the ethylene content of said fraction is 40–70% by weight; and the melt index of the ethylene copolymer is not in excess of 3.

3. A high impact polyolefin composition consisting essentially of a binary polymer blend of (i) 75–85% by weight of an impact-modified propylene polymer which has a melt flow of about 1–50 dg/min and an elastomeric propylene-ethylene copolymer content of 8–15% by weight, the copolymer fraction having an ethylene content of 45–65% by weight, and which is the product of sequential polymerization of propylene and a propylene-ethylene mixture over a titanium halide-containing coordination catalyst and (ii) 15–25% by weight of a linear low density ethylene copolymer which is the product of polymerization of ethylene with up to 10 mole percent of at least one $C_3$–$C_8$ alpha olefin monomer over a transition metal-based coordination catalyst and which has a density in the range from 0.912 to 0.921 and a melt index not exceeding 1.0.

* * * * *